Figure 1:
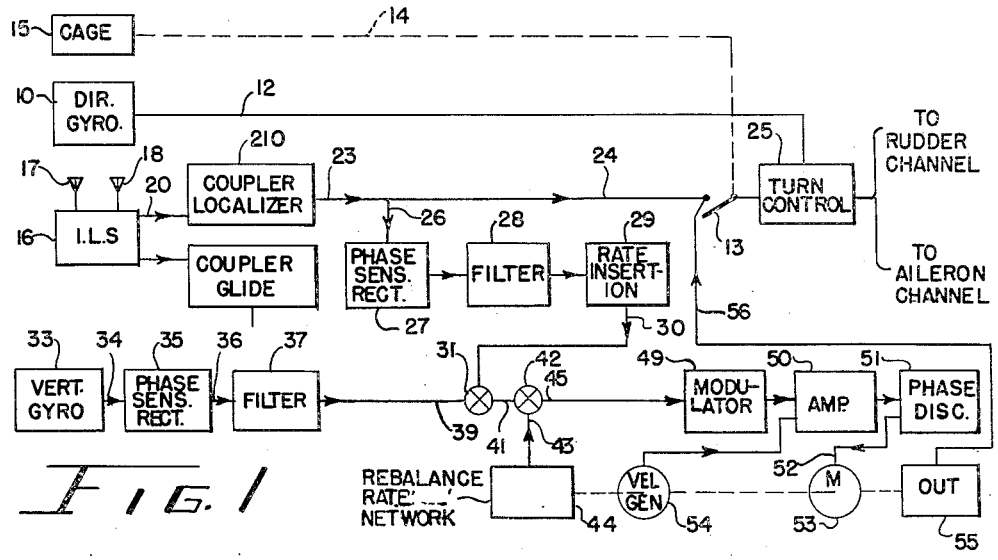

March 12, 1957 W. H. GILLE 2,784,924
AUTOMATIC STEERING MECHANISMS
Filed Oct. 27, 1950 3 Sheets-Sheet 1

*INVENTOR.*
WILLIS H. GILLE
BY
George H Fisher
*ATTORNEY*

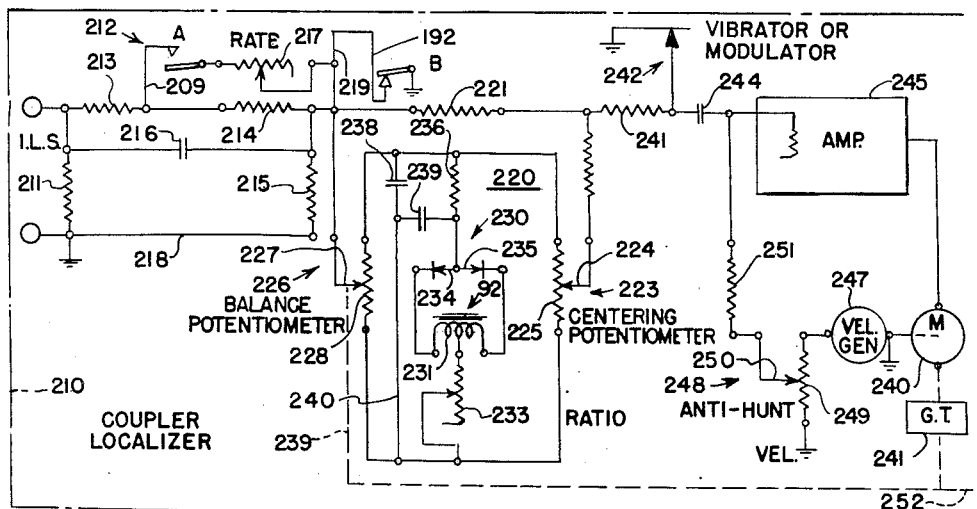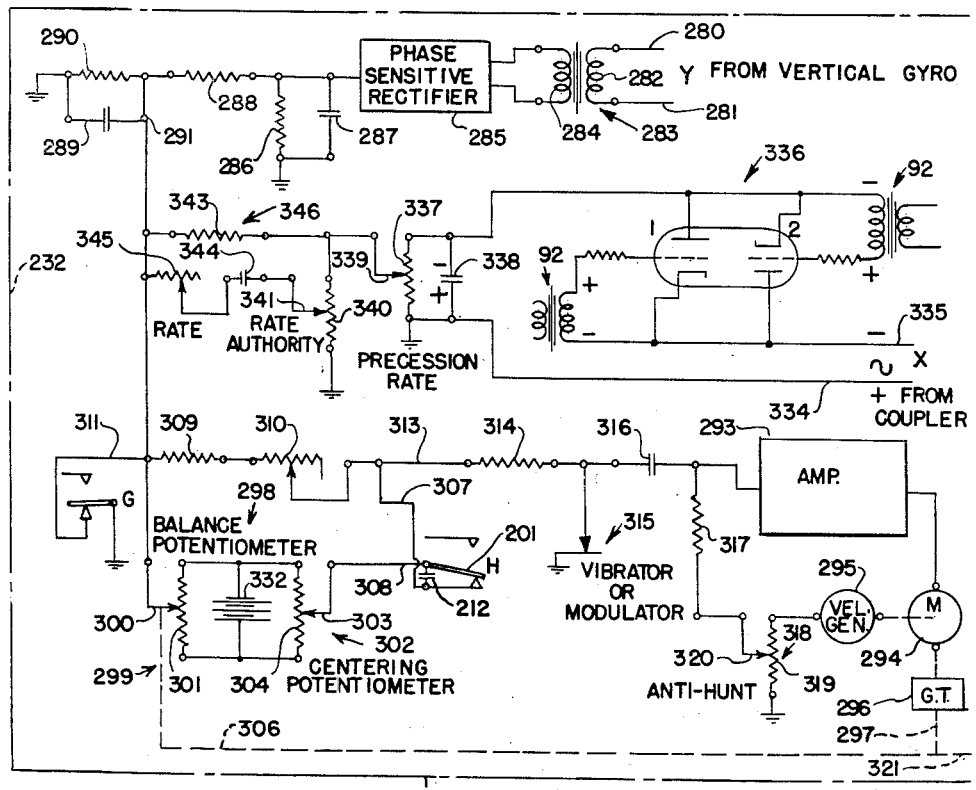
FIG. 3
INVENTOR.
WILLIS H. GILLE

_United States Patent Office_  2,784,924
Patented Mar. 12, 1957

2,784,924

AUTOMATIC STEERING MECHANISMS

Willis H. Gille, St. Paul, Minn., assignor to Minneapolis-Honeywell Regulator Company, Minneapolis, Minn., a corporation of Delaware Application October 27, 1950, Serial No. 192,477

26 Claims. (Cl. 244—77)

This invention pertains to automatic steering mechanisms for dirigible craft such as aircraft. Such steering mechanisms are commonly referred to as automatic pilots. An automatic pilot is generally provided with a heading maintaining or stabilizing device. In some instances such stabilizing device is a directional gyroscope but in other instances it may be a computing device.

Automatic control of the flight of an aircraft by automatic pilots has progressed to the point where an aircraft is automatically controlled to follow a path defined by waves transmitted from a radio transmitting station. When the craft is automatically controlled to follow this path, it is primarily controlled by radio signals. However, it is desirable to have a stabilizing device responsive to change in heading for additionally controlling the craft while it is following the path.

In some instances, it may be desirable to precess the gyroscope to provide an integral control function in order that the craft follow the path at a heading angularly displaced therefrom to offset for cross wind or steady state error. In some cases this gyroscope might lack a precessing arrangement. Such gyroscope, as will become apparent, would be unsuitable as a stabilizing device in an arrangement that applies a crab angle to the aircraft to compensate for a cross wind and or steady state error inducing causes.

It is therefore an object of this invention to provide a suitable stabilizing device which may be used as a substitute for a non-precessible directional gyroscope during radio control of an aircraft.

It is a further object of this invention to stabilize the heading of an aircraft from a device responsive to angular movement of the craft about its longitudinal axis.

It is a further object of this invention to stabilize the heading of a craft by integrating with respect to time the magnitude of response of a device adjusted in accordance with the roll attitude of said craft.

It is a further object of this invention to control the heading of an aircraft in accordance with radio signals proportional to the displacement of the craft from a path defined by a radio transmitter and in accordance with the time integration of the magnitude of roll of the craft.

It is a further object of this invention to control the heading of an aircraft in accordance with radio signals and in accordance with a signal proportional to a time integration of the magnitude of bank or roll of said craft and of said radio signal to compensate for drift of said craft.

It is a further object of this invention to control the heading of an aircraft in accordance with radio signals and with a signal proportional to a time integration, of the magnitude of bank of said craft, of said radio signal, and of the rate of change of said radio signal, to compensate for drift or steady state error inducing cause.

A further object of this invention is to derive alternating voltage signals in accordance with the displacement of an aircraft from a radio beam and in accordance with the magnitude of bank of said craft and to rectify such voltages and subsequently apply the former to a differentiation network and thereafter with said bank signal to an integration network and using said integrated signal for thereafter automatically causing said craft to follow said beam with a heading offset from the beam to compensate for a cross wind or other conditions such as an out of trim condition of said craft which would cause a steady state error in the position of said craft with respect to the radio beam defined path.

It is a further object of this invention to provide a novel rectifying device for alternating voltages used in controlling the heading of said craft.

Another object of this invention is to provide an automatic steering apparatus for a craft controlled from a device responsive to change in heading of said craft and having manual means to transfer control of said steering apparatus to a gravitational controlled device responsive to angle of roll of said craft.

Another object of the invention pertains to novel features of the components described herein for achieving the principal objects of the invention and to novel principles employed in such components whether or not these features and principles are used for the principal objects.

Figure 2:
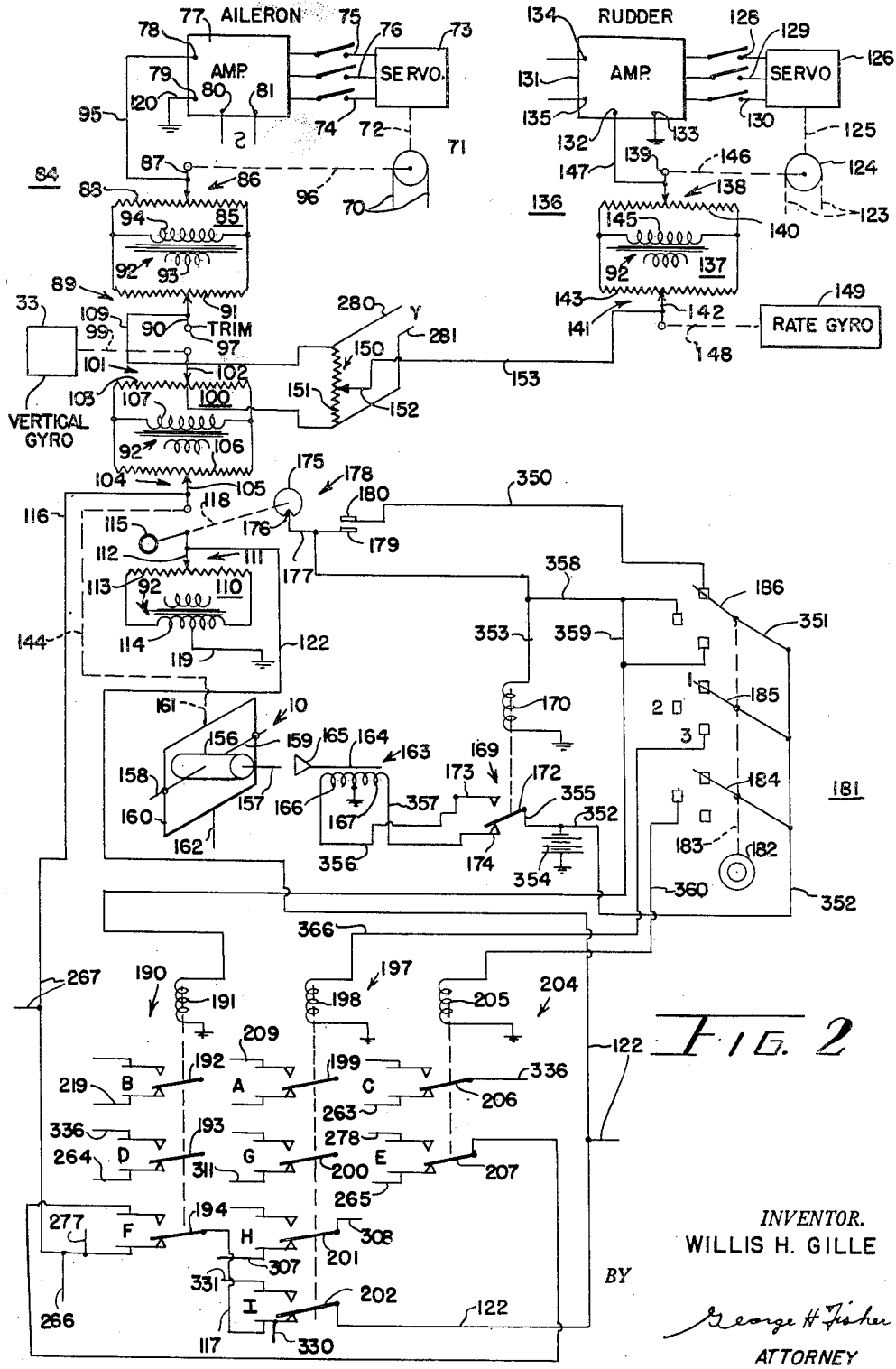

Other objects and advantages of the invention will become evident from a consideration of the specification taken in conjunction with the accompanying drawings wherein:

Figure 1 is a block or flow diagram illustrating two separate control systems for alternatively operating the ailerons and rudder of the aircraft, with manual means for transferring control from one to the other, Figures 2, 3 and 4 together constitute a schematic representation of the inter-relationship and details of the components of the system illustrated in Figure 1.

Referring to Figure 1, a directional gyroscope 10 having three axes of freedom and responsive to changes in heading of an aircraft supplies information to the conductor 12 and through a craft turn control section 25 and rudder and aileron channels to servomotors to operate the rudder and ailerons of an aircraft to maintain the course of the craft. The structure of the channels will be subsequently discussed. The directional gyroscope 10 therefore is ordinarily used for stabilizing the course steered.

When it is desired, the craft may be caused to respond to signals transmitted from a radio station whereby the craft may be automatically steered along the localizer beam whose direction is determined by the transmitted waves. When the craft is to be automatically controlled from the radio waves, transfer means 13 is moved to the closed position evident in the figure. This movement to the closed position results in adjusting an operating means 14 which operates a caging mechanism 15 to center and hold the gyroscope rotor with respect to the craft and thus to cage the directional gyroscope 10. Additionally, closing of the transfer means 13 results in the introduction of radio control to a localizer beam from a radio receiver 16 and heading control of the craft from a vertical gyroscope 33.

The receiving means 16, as conventional, is provided with energy receiving antennas 17 and 18 which are energized in proportion to the angular displacement of the craft from the localizer beam as is more fully described in application 49,442 of Alderson et al., filed September 15, 1948. Additionally, this receiver 16 includes, which is unnecessary to an understanding of the present invention, mechanism that is responsive to signals which are in proportion to the angular displacement of the craft from a glide path beam.

The information on the angular displacement of the craft from the localizer beam in the nature of a direct voltage is transmitted by conductor 20 to a localizer coupler 210. Here the direct voltage on conductor 20 is thence modified by a differentiation circuit and converted to an alternating voltage. The alternating voltage output of the coupler 210 is transmitted directly through transmitting means 23, 24 and through the closed transfer member 13 to the turn function section 25 of the automatic pilot to control the rudder and ailerons. Additionally the output of the coupler 210 is led by transmitting means 23, 26 to a phase sensitive rectifier 27 for converting the alternating voltage to direct voltage. The direct voltage output from the rectifier 27 is applied to a filter 28 and thence to differentiation or phase shifting network 29 where a rate component is added to the displacement signal. The output of the differentiation network 29 is led by transmitting means 30 to a summing device 31.

A further voltage is applied to the summing device 31 by the following arrangement. A vertical gyroscope 33 generates an alternating voltage in accordance with the roll attitude of the craft or its attitude about its longitudinal axis. This alternating voltage is led by transmitting means 34 to a second phase sensitive rectifier 35 whose direct voltage output is led by transmitting means 36 to a filter 37. From filter 37 the direct voltage is led by transmitting means 39 to summing device 31. The summing device 31 obtains the difference between the voltage from transmitting means 30 and the voltage from transmitting means 39. The output from summing device 31 is fed through transmitting means 41 to a second summing device 42.

The summing device 42 has two inputs, namely the aforesaid transmitting means 41 extending from summing device 31 and the transmitting means 43, and the output 45 of the summing device 42 is applied to a modulator or vibrator 49 where the direct voltage is converted to alternating voltage and applied to an amplifier 50. The output of amplifier 50 is applied to a phase discriminator 51. The output of the discriminator 51 is transmitted by means 52 to a variably energized winding of a capacitor type induction motor 53. The motor 53 operates a velocity generator 54 whose voltage output depends upon the speed of the motor 53. The motor 53 additionally operates a rebalancing device 44 which includes a rate network. The output of the rebalancing device is fed to the summing device 42. The output of the velocity generator 54 is combined with the output of the modulator 49 and is applied to the amplifier 50.

The motor 53 drives an output device 55 to make effective use of the operation of the motor. The adjustment of the output device 55 represents the time integration of the bank of the aircraft as modified by the localizer signal from the receiver 16. The output device 55 has its adjustment carried by transmitting means 56 and through the transfer means 13 through the turn control system 25 and servomotors to the rudder and ailerons of the aircraft.

Having dwelt only on the general operation of the arrangement and for a greater detailed description of the apparatus of Figure 1, reference is made to Figures 2, 3 and 4. In Figure 2 there is shown an arrangement for automatically maintaining the craft on a selected heading and permitting manual changes in heading of the aircraft through the apparatus. The maintaining of the heading of the craft automatically and the change in heading are effected by the operation of the ailerons and rudder control surfaces of the aircraft. The ailerons (not shown) of the aircraft may be directly manually positioned or may be positioned by power means through cables 70 extending from a cable drum 71. The cable drum 71 is carried on the output shaft 72 of a servomotor 73 which provides the power means. The servomotor 73 is reversibly controlled from a discriminator form of amplifier 77 by means of amplifier output conductors 74, 75 and 76 extending to the servomotor. Each conductor includes a single pole single throw switch for breaking the circuit from the amplifier to the servomotor and such breaking of the circuit may be made when direct manual operation of a control surface is to be made. The amplifier 77 includes an amplifier and a discriminator section as in Figure 1 and includes alternating voltage signal input terminals 78, 79 and alternating voltage power input terminals 80, 81. The direction of rotation of the servomotor 73 depends upon the phase relationship between the voltages across signal input terminals 78, 79 and power input terminals 80, 81. The amplifier-servomotor combination may thus be similar to that disclosed in Patent 2,425,734 to Willis H. Gille et al.

Input control voltage signals to terminals 78 and 79 of amplifier 77 are derived from a balanceable potentiometer network 84. The network 84 comprises the servobalance-manual trim potentiometer bridge 85, a vertical gyroscope-directional gyroscope potentiometer bridge 100, and a manually operable turn control potentiometer 110. The potentiometer bridge 85 comprises a servobalance potentiometer 86 having a slider 87 and a resistor 88, a manual operable trim potentiometer 89 having a slider 90 and a resistor 91, and a transformer 92 having a primary winding 93 and a secondary winding 94. The resistor 88 is connected across the ends of secondary winding 94, and the slider 87 is positioned along resistor 88 by an operative connection 96 extending from the servomotor shaft 72. A conductor 95 extends from amplifier input terminal 78 to slider 87. Resistor 91 of potentiometer 89 is connected across the secondary winding 94 in parallel with resistor 88. Slider 90 may be positioned along resistor 91 by a manually operable trim knob 97. It is apparent that the output terminals of potentiometer bridge 85 are the sliders 87 and 90.

Potentiometer bridge 100 includes a banking potentiometer 101 having a slider 102 and a resistor 103, a heading potentiometer 104 having a slider 105 and a resistor 106, and a transformer secondary winding 107. A single transformer primary winding may supply a plurality of secondary windings and thus the secondary winding 107 (like other secondary windings to be described) forms part of transformer 92 containing the single primary winding 93. Resistor 103 is connected across the ends of secondary winding 107. Slider 102 may be positioned along resistor 103 by means of an operating connection 99 extending from a vertical gyroscope 33. The vertical gyroscope 33 is of the type well known in the art whose rotor is mounted in two gimbel rings with cross supports so that the rotor spin axis is perpendicular, but rotation about two cross horizontal axes is permitted. The gyroscope is provided with suitable erecting means well known in the art to maintain the rotor thereof perpendicular with respect to the earth. Such erecting means may be controlled by mercury levels or pendulums as is well known and thus the gyroscope may be considered a gravitationally responsive device. The slider 102 has a conductor 109 extending therefrom backward to slider 90 of potentiometer 89.

Resistor 106 of potentiometer 104 is connected across the ends of secondary winding 107 in parallel with resistor 103. Slider 105 is positioned along resistor 106 in accordance with changes in heading of the aircraft by means of an operating connection 144 extending from a directional gyroscope 10.

The turn control network 110 includes a manual turn control potentiometer 111 having a slider 112 and a resistor 113, and a secondary winding 114 of transformer 92. Resistor 113 is connected across the ends of secondary winding 114. Slider 112 is positioned along resistor 113 by an operating connection 118 from a manually operable turn control knob 115. Slider 112 is connected to slider 105 of the preceding potentiometer bridge 100 by conductor 122, conductor 117, conductor 267, conductor 116 and closed relay contacts to be described. Secondary winding 114 has a center tap which is connected by conductor 119 to ground and thus to ground conductor 120 of amplifier 77.

It will now be apparent that with the sliders of the potentiometers in network 84 at the electrical centers of their respective resistors that the network 84 is in a balanced condition and no control voltage signal will be applied across terminals 78 and 79 and servomotor 73 will be unoperated. The manner in which control signals are derived will be considered subsequently.

Continuing to the rudder operating means, the rudder (not shown) of the aircraft may be operated directly manually or automatically from cables 123 extending from a drum 124 carried by a shaft 125 driven by a servomotor 125. The servomotor 126 is reversibly controlled from amplifier 131 by means of conductors 128, 129, 130. Each of the conductors includes a single pole single throw switch which is in the open position when direct manual operation of the rudder is performed. The amplifier-servomotor combination for operation of the rudder may be similar to that provided for operation of the aileron. The amplifier 131 includes alternating voltage signal input terminals 132, 133 and alternating voltage power input terminals 134, 135.

Control voltages across amplifier input terminals 132, 133 are derived from a balanceable potentiometer network 136 comprising a servo balance-rate gyro potentiometer bridge 137, a vertical gyro bank ratio potentiometer 150, heading potentiometer 104, and turn control potentiometer 111. Potentiometer bridge 137 comprises a servo balance potentiometer 138 having a slider 139 and a resistor 140, a rate of turn operated potentiometer 141 having a slider 142 and a resistor 143, and a secondary winding 145 of transformer 92. Resistor 140 is connected across the ends of secondary winding 145. Slider 139 is positioned along resistor 140 by a follow up connection 146 extending from the output shaft 125 of servomotor 126. A conductor 147 extends from amplifier input terminal 132 to slider 139. In potentiometer 141, resistor 143 is connected across the ends of secondary winding 145 in parallel with resistor 140. Slider 142 is positioned along resistor 143 through a suitable operating connection 148 extending from a yaw rate gyroscope 149.

The yaw rate gyroscope 149 is of a type well known in the art whose rotor is mounted for rotation about a horizontal axis in a suitable support and this support in turn is mounted for angular rotation about a horizontal axis at right angles to the spin axis of the rotor. This second axis has restraining means to oppose the rotation of the support about this axis and the arrangement is so mounted in the aircraft that upon movement of the craft about its vertical or turn axis the effect on the gyroscope is to cause it to precess about the axis of the support in accordance with the rate of turn of the aircraft.

Potentiometer 150 includes a resistor 151 and an adjustable tap 152. Resistor 151 has one end connected to slider 102 of the banking potentiometer 101 and has its opposite ends connected to a center tap of resistor 103 so that as slider 102 is positioned along resistor 103 the voltage thereby generated is applied across resistor 151. Tap 152 may be manually positioned along resistor 151. A conductor 153 extends from the tap 152 to slider 142 of the rate gyro operated potentiometer 141. The remainder of network 136 comprising potentiometers 104 and 111 have been previously described in network 84. As with the aileron network 84, so also in the rudder network 136, with the various sliders of the potentiometers at the centers of their respective resistors the network 136 is in a balanced condition and no control voltage is generated to be applied across amplifier input terminals 132, 133.

Reverting to the directional gyroscope 10, the gyroscope includes a rotor, not shown, mounted for rotation about a horizontal axis in casing 156. The casing is supported by trunnions 158, 159 about an axis at right angles to the rotor spin axis in an outer vertical gimbal ring 160. The outer ring 160 has an upper trunnion 161 and lower trunnion 162 which are suitably journaled in bearings not shown. Extending from the upper trunnion 161 is the operating connection 144 for slider 105 of potentiometer 104. Thus, the gyroscope 10 tends to stabilize slider 105 while the resistor 106 is carried along with the aircraft so that a relative movement of the slider with respect to the resistor results. This relative movement is in direct proportion to the angular change in heading of the aircraft. The gyroscope 10 is provided with a caging mechanism 163 for centering the casing 156 and holding it against movement relative to the aircraft so that slider 105 is centered. The caging device includes a longitudinally operated member 164 which has at one end a hollow conical member 165 which may be engaged with an extension 157 from casing 156 which extension is aligned with the rotor axis. The operating means for the member 164 is of the electromagnetic type and includes a caging coil 166 and an uncaging coil 167 which may be alternatively energized.

Associated with the caging mechanism 163 is a caging control relay 169. This relay is of the single pole double throw type having an operating coil 170 which adjusts a single pole double throw arm 172 between an out contact 174 and an in contact 173. The circuit to operating coil 170 is controlled, in one instance, from a switch 178. A pivoted operating arm 177 of the switch includes a contact 179 at one end. The arm 177 has the other end laterally offset to engage a notch 176 in a disc 175 carried by shaft 118 operated from the turn control knob 115. It is apparent that rotation of knob 115 in either direction causes the offset portion of arm 177 to ride up on to the periphery of the disc 175 and effect engagement of contact 179 with fixed contact 180 of switch 178.

The effectiveness of the operated switch 178 is controlled by a function selector 181. The function selector comprises a rotatable spindle 183 having a manually operable knob 182 mounted on one end thereof. Longitudinally spaced on the spindle 183 are three contact arms 184, 185, 186. Each arm coacts with three peripherally spaced contacts. Each arm with its associated contacts comprises one section of the function selector. As shown in the second section, the function selector may be placed in three distinct posittions and each arm engages a separate contact in each position. The number one position is designated the autopilot control position, the second position is designated the localizer or "in" position and the third is the glide position.

Associated with the localizer and glide contacts of the upper section shown of the function selector 181 is a relay 190. Relay 190 includes an operating coil 191 for operating switch arms 192, 193, 194 each of which switch arms coacts with an in and an out contact. The contacts associated with arm 192 are designated the B contacts, those associated with arm 193 are designated the D contacts, and those associated with arms 194 are designated the F contacts.

Associated with the third position contact or glide contact of the second switch section of the function selector is a four hole double throw relay 197. Relay 197 includes an operating coil 198 for four double throw arms 199, 200, 201 and 202 of the relay. Each relay arm coacts with an in and an out contact. The contacts engaged by arm 199 are designated the A contacts, those engaged by arm 200 are designated the G contacts, those engaged by arm 201 are designated the H contacts, and those engaged by arm 202 are designated the I contacts.

Associated with the second or localizer function selector position contact of the lower section of the function selector 181 is a three pole relay 204. Relay 204 includes an operating coil 205 for arms 206, 207. Each arm coacts with an in and an out contact. The contacts associated with arm 206 are designated the C contacts, those associated with arm 207 are designated the E contacts.

With the function selector 181 in the number one position, the directional gyroscope 10 stabilizes the aircraft on a selected heading and the vertical gyroscope stabilizes the craft about its roll axis. In this configuration, changes in heading are effected by operation of the turn control knob 115 at which time the directional gyroscope 10 is caged to prevent its opposing the turn or change in heading made by operation of the manual control knob 115. It is also desirable, at times, to control the heading of the aircraft other than by the stabilizing and manual control means of Figure 2 and to control solely from radio signals during localizer position of the function selector and also alternatively to control the heading of the aircraft from a combination of radio signals and aircraft bank attitude integration signals in the glide position of the function selector. In both of the configurations using radio control the directional gyroscope will be maintained caged.

The arrangement for controlling the craft solely from radio signals with the function selector in localizer or number two position will now be described.

Referring to Figures 3 and 4, the coupler 210 is supplied with a direct voltage signal proportional to the angular displacement of the aircraft from the path defined by the beams transmitted from a radio transmitting station. The polarity of this voltage depends upon which side of the path the aircraft is occupying. The direct voltage output from the instrument landing receiver 16 Fig. 1, is applied across a resistor 211 of coupler 210. One end of resistor 211 is connected to ground. Connected across resistor 211 in series relationship beginning with the ungrounded end of resistor 211 are resistors 213, 214 and 215. A capacitor 216 is connected in the circuit in parallel with resistors 213, 214. It is thus evident that the voltage across resistor 215 is a composite voltage being proportional to the voltage across resistor 211 plus the rate of change of the voltage across resistor 211. In shunt with resistor 214 by means of the in contact in section A of relay 197 is a variable resistor 217. It is evident that with the A section of relay 197 in the in position that a greater proportion of the current through resistor 215 will be obtained through the branch circuit comprising resistor 213 and resistors 214, 217 in parallel than would be obtained with the A section of the relay in the out position. Therefore with the relay in the in position less current passes through the condenser 216 and a smaller portion of the voltage across resistor 215 constitutes the rate voltage.

The voltage across resistor 215 is an operation initiating voltage and is opposed by a rebalancing voltage and a damping voltage. The rebalancing voltage is derived from the voltage drop across a load resistor 221 placed across a potentiometer bridge 220. The network 220 comprises a centering potentiometer 223 having a slider 224 and a resistor 225, a balancing potentiometer 226 having a slider 227 and a resistor 228 with both resistors 225, 228 connected across a D. C. power supply 230. The power supply 230 includes a secondary winding 231 of transformer 92. A variable resistor 233 has one end connected to a center tap of secondary winding 231 and has its opposite end connected to one end of each resistor 225 and 228. Two rectifiers 234, 235 are connected in series but in opposite relation and as thus arranged are connected across the secondary winding 231. A resistor 236 has one end connected to the junction of rectifiers 234, 235 and its opposite end is connected to each of the free ends of resistors 225, 228. Two condensers 238, 239 are connected in series and as arranged are shunted across the resistor 236. A conductor 240 extends from the junction of condensers 238, 239 to the end of resistor 233 remote from the center tap of secondary winding 231. It is thus apparent that the power supply 230 applies voltage of one polarity continuously across the resistors 225 and 228.

If the sliders 224 and 227 have a relative differential displacement they will have different potentials and this will result in a current being passed through load resistor 221. The voltage across this resistor constitutes a rebalance voltage. The slider 224 of the centering potentiometer may be manually adjusted. The slider 227 of the balance potentiometer is positioned by follow-up operating connection 239 through a high ratio gear train 241 from a coupler motor 240. The initiating voltage and the follow-up voltage are placed in opposed relation by connecting one terminal of resistor 215 to one end of resistor 221. The opposite end of resistor 215 is connected to ground by conductor 218. The opposite end of resistor 221 is connected in series with a resistor 241 and through a D. C. to A. C. converter 242 to ground.

The converter 242 may be in the form of a conventional vibrator which is operated from a source of voltage having a frequency the same as that applied to transformer 92. The output of the vibrator 242 is applied to an amplifier 245 through a coupling condenser 244. The amplifier 245 is of the discriminator type having alternating signal voltage terminals and alternating input voltage power terminals and its output is used to control the direction of rotation of a motor 240. Motor 240 may be a capacitor type induction motor having an amplifier winding and line winding which are energized in accordance with the phase relation of the amplifier input and line voltages. The amplifier-motor combination may be such as disclosed in U. S. Patent 2,020,275 to Beers. Such motor has its line winding connected to a source of voltage and its phase winding is energized from the amplifier. The energization of this phase varies from 90° lead to 90° lag from the energization of the line winding depending upon the operation of amplifier 245.

The motor 240 as stated drives the rebalancing potentiometer slider 227 through a gear train 241 having a very high gear ratio. Motor 240 also drives a velocity generator 247 which generates a voltage in accordance with the rotational speed of the motor. Such velocity generators are well known in the art and comprise a primary winding connected to the source of voltage and a secondary winding inductively associated with the primary winding by means of a cylindrical rotor driven by the motor. The A. C. output across the velocity generator secondary is applied across a voltage dividing potentiometer 248. The potentiometer 248 comprises a resistor 249 connected across the secondary winding of the velocity generator and an adjustable tap 250. The tap 250 is connected through a limiting resistor 251 to the input terminal of amplifier 245.

As thus arranged, the initiating voltage across resistor 215 is opposed by the follow-up voltage across resistor 221 and the antihunt or damping voltage selected by tap 250 from the voltage appearing across resistor 249. The motor 240 thus rotates an extent in proportion to the voltage appearing across resistor 215. While the voltage across resistor 215 may be applied as thus stated to amplifier 245, it may also be bypassed by connecting the junction of resistors 215 and 221 by a conductor 219 to the out contact of section B in relay 190.

The rotation of the coupler motor 240 is utilized to control the heading of the aircraft by the following means. Motor 240 through drive means 252 controls a potentiometer 253, Figure 4, which is effective in the glide or No. 3 position of the function selector. The motor 240 also controls a potentiometer 270—which is effective in the localizer or No. 2 position of the function selector. Potentiometer 253 comprises a slider 254 and a resistor 255. Resistor 255 is connected across the ends of a secondary winding 256 of transformer 92. Slider 254 is positioned along with resistor 255 by a suitable operating connection 252 from the output of gear train 241 connected to motor 240. Displacement of slider 254 from its electrical center on resistor 255 results in a difference of potential between the slider and a center tap of secondary winding 256 and this voltage is applied across a primary winding 261 of an isolating transformer 260 having a secondary winding 262. The ratio of the turns in the two windings of the transformer is 1 to 1. One end of secondary winding 262 is connected by conductor 263 to the out contact of section C in relay 204. The opposite end of secondary winding 262 is connected by conductor 264 to the out contact of section D in relay 190. The function of the voltage derived from secondary winding 262 will be subsequently considered.

The potential between slider 254 and the center tap of secondary 256 is also applied across a resistor 258 of a voltage dividing potentiometer 257. This potentiometer includes an adjustable tap 259. A conductor 265 extends from the tap 259 to the out contact of section E in relay 204. The slider connected end of voltage dividing resistor 258 has a conductor 266 extending therefrom to the out contact of section F in relay 190. The function of the voltage obtained from the voltage dividing potentiometer 257 like the voltage from secondary winding 262 will be subsequently described, but it should be noted that it is utilized during the approach position of the function selector.

The operating means 252 for slider 254 also adjusts as stated a slider 271 of a potentiometer 270. Potentiometer 270 includes a resistor 272 connected across the ends of a secondary winding 273 of transformer 92. A voltage dividing potentiometer 274 has its resistor 275 connected across a center tap of secondary winding 273 and slider 271. Voltage dividing potentiometer 274 includes an adjustable tap 276. A conductor 278 extends from tap 276 to the in contact of section E in relay 204. The junction of resistor 275 and slider 271 has a conductor 277 extending therefrom to the out contact of section F in relay 190. It is thus evident, in Figure 4, that with the in contacts of sections E and F of respective relays 204, 190 engaged the vloatge selected from voltage dividing potentiometer 274 is applied by conductors 277 and 267 and by conductors 117, 122 between the directional gyroscope potentiometer 104 and potentiometer 111 as a turn function controller into the automatic pilot.

When the function selector knob 182 is in the No. 2 or No. 3 position suitable control circuits are closed so that the directional gyroscope 10 is caged. With the function selector in the No. 2 position no directional stabilizing device responsive to change in angular position of the craft about an axis is utilized, and the heading of the craft is controlled from the output of voltage dividing potentiometer 274. Thus, radio means are the sole means of controlling the heading of the craft. However, when the aircraft has bracketed or has been placed on the localizer path due to control in heading from potentiometer 274, some means of stabilizing the heading of the aircraft by apparatus on the aircraft is desired. With the directional gyroscope caged, stabilization is provided by a directional gyroscope substitute.

This substitute directional control is responsive to bank of the craft. It is assumed that the craft tilts about its roll axis in incurring heading deviations. The rate of change of heading is proportional to the bank of the craft. It we integrate with respect to time the rate of change of heading we obtain the actual angular change in heading. With rate of change of heading proportional to the bank angle as stated, it follows that if we integrate the bank angle of the craft with respect to time we also thereby obtain the angular change in heading of the aircraft.

A novel arrangement is provided to obtain the integration of the bank angle of the craft. A voltage proportional to the bank angle of the craft is obtained from potentiometer 101, Figure 2, whose slider is adjusted with respect to the electrical center of resistor 103 from the vertical gyro 33 in proportion to the magnitude of bank of the aircraft. The alternating voltage proportional to the bank attitude of the aircraft is applied across resistor 151 of the voltage dividing potentiometer 150. Extending from opposite ends of the resistor 151 are two conductors 280, 281 which thereby have a voltage across them proportional to the bank angle of the craft. Conductors 280 and 281 are connected respectively to the opposite ends of a primary winding 282, Figure 3, of an isolating transformer 283 having a secondary winding 284 inductively related to the primary winding. The ratio of turns of the secondary to the primary winding is 1 to 1.

The output voltage from secondary winding 284 is applied to a phase sensitive rectifier 285 (to be specifically described) and the output of the phase sensitive rectifier appears across a load resistor 286. A smoothing condenser 287 is connected in parallel across the resistor 286 which is used as a storing device during the operative half cycle of the rectifier and is used during the unoperative half cycle as a discharging device to maintain substantially constant the voltage drop across resistor 286. The end of load resistor 286 adjacent the rectifier 285 is connected to one end of a resistor 288 which is in series with ground resistor 290. The opposite end of resistor 286 is connected to ground. Connected across resistor 290 is a filter condenser 289. It is thus apparent that the voltage thus far appearing at the junction 291 of the resistor 288 and resistor 290 is proportional to the bank angle voltage.

This voltage is used to control a further amplifier-motor combination 293, 294. The amplifier 293 (Figure 3) is similar to amplifier 245 previously mentioned being controlled by an alternating input circuit that supplies a control voltage and being supplied with an alternating power input voltage. The amplifier 293 controls a capacitor type induction motor 294. The motor 294 may be similar to motor 240 and includes an amplifier energized winding and a line energized winding. The amplifier 293 energizes the phase winding in quadrature lead or lag relationship to the energization of the line winding depending upon the phase of the control signal voltage applied to amplifier 293 with respect to its power input voltage. The motor 294 drives directly a velocity generator 295 whose output voltage is proportional to the speed of rotation of motor 294. The velocity generator 295 is similar to velocity generator 247 and is of the type shown in generator 17 in Figure 1 of Patent 2,115,086 to Riggs. The motor 294 additionally drives through a gear train 296 having a somewhat lower gear ratio an output shaft 297.

Reverting to the amplifier 293, the amplifier is supplied with control voltage signals obtained from the summing resistor 290, a rebalancing potentiometer bridge 298, and a voltage dividing potentiometer 318.

The potentiometer bridge 298 consists of a rebalancing potentiometer 299 having a slider 300 and a resistor 301, a centering potentiometer 302 having a slider 303 and a resistor 304, and a source of direct voltage such as a battery 332. Resistors 301 and 304 are connected in parallel across the battery 332. Slider 300 is adjusted along resistor 301 from the electrical center thereof by an operating connection 306 driven from output shaft 297 of gear train 296. Slider 303 may be manually adjusted.

A conductor 308 extends from slider 303 to the relay arm 201 of section H in relay 197. Extending from the out contact of section H of relay 197 to slider 300 and starting from the out contact are a conductor 307, a variable resistor 310 and a resistor 309. The junction of resistor 309 and slider 300 is connected to the out contact of section G of relay 197 by a conductor 311. A rate condenser 312 is connected across the out contact and relay arm of section H in relay 197.

The voltage proportional to the bank angle of the craft which appears across resistor 290 is in series with the rebalancing potentiometer bridge signal applied across resistor 309 and resistor 310. The two voltages as combined are applied to a vibrator 315. The combined voltages are converted from direct to alternating by the vibrator 315. The resultant alternating voltage is applied through a coupling condenser 316 to amplifier 293. A velocity signal from voltage dividing potentiometer 318 is applied from the tap 320 through a limiting resistor 317 to amplifier 293 so that the sum of three voltages is applied to the amplifier.

The amplifier effects operation of the motor 294 which drives the slider 300 of the rebalance potentiometer 299 until the input voltage to the amplifier 293 is reduced to zero. The extent of rotation of motor 294 is thus proportional to an integration of the angle of bank of the aircraft and thus proportional to the change in heading or deviation. This is apparent since the rebalance voltage from potentiometer bridge 298 which in effect is a feed back voltage is applied through a rate network comprising condenser 312 and resistor 309 to amplifier 293 to rebalance the bank signal voltage. The effect of this network is the same as if the bank signal were directly integrated. The rotation of motor 294 which is proportional to heading change is also applied through an operating connection 321 to slider 322, Figure 4, of an autopilot control potentiometer 323. Potentiometer 323 includes a resistor 324 which is connected across a secondary winding 325 of transformer 92. A voltage dividing potentiometer 327 has a resistor 328 which is connected across slider 322 and a center tap of secondary winding 325. A conductor 330 extends from the junction of slider 322 and resistor 328 to the out contact of section I in relay 197. A conductor 331 extends from slider 329 to the in contact of section I in relay 197. It is now apparent that with the relay arms of sections I and F in the in position that the voltage from the potentiometer 327 is applied in series with the voltage from potentiometer 257 and through conductors 122 on the one hand and conductors 266, 267, 116 on the other hand to the turn function control of the automatic pilot.

While the two signals mentioned, which were obtained from potentiometers 327 and 257, will in general, be adequate to cause the aircraft to follow a localizer beam after the same is once bracketed and cause also the craft to be headed in the direction of the beam yet it may be desirable to include in the arrangement for controlling from the two signals mentionend a further signal for compensating for a cross wind or other out of trim condition which the aircraft may encounter. The source of voltage which provides a compensation signal in the arrangement to offset the effect of a cross wind is obtained from secondary winding 262 of isolating transformer 260, Figure 4, previously described. One end of secondary winding 262 has as stated a conductor 263 extending to an out contact of section C of relay 204. The relay arm 206 of this section has a conductor 336 extending to the in contact of section D of relay 190. A conductor 335 extends from the relay arm of section D. A conductor 264 extending from the opposite end of secondary winding 262 connects with a further conductor 334 so that the voltage appearing across conductors 334 and 335 is that obtained from the coupler motor operated potentiometer 253. This voltage across conductors 334 and 335 is the output voltage from the auto approach coupler 210 and is thus proportional to the angular displacement of the craft from the localizer path as further modified by network 212.

The conductors 334 and 335 extend to a novel phase sensitive vacuum tube rectifier 336, Figure 3, similar to rectifier 285. The rectifier 336 includes two sets of triode tube elements 1 and 2. The plate of set 1 is connected to the cathode of set 2, and vice versa, the plate of set 2 is connected to the cathode of set 1. A secondary of a transformer is connected between the grid and cathode of set 1 and a secondary of a transformer is connected between the grid and cathode of set 2. The phase of the voltage between the grid and the cathode of one set is the same as that across the grid and cathode of the other set as indicated by the polarity signs in Figure 3 of these secondaries. Conductor 334 is connected through a loading resistor 337 to the plate of set 1 and to the cathode of set 2. Conductor 335 on the other hand is connected to the plate of set 2 and to the cathode of set 1. If we assume conductor 334 positive in the half cycle under consideration with respect to conductor 335 and assume the grid in set 1 and the grid in set 2 positive with respect to their cathodes as indicated by the polarity signs of Figure 3 then in the half cycle under consideration the elements of set 2 will be nonconducting since the cathode is positive relative to the plate whereas the elements of set 1 will be conducting and electrons will flow from the upper end of resistor 337 toward the lower end. On the next half cycle both grids of the two sets will be negative with respect to their cathodes so that neither set of tube elements will conduct. As a consequence electrons from one or the other set of elements flow through resistor 337, with the arrangement as described, only in alternate half cycles of the applied voltage from conductors 334, 335.

In order to provide the effect of full wave rectification the condenser 338 is shunted across resistor 337. Thus, in the second half cycle mentioned when the grids are negative with respect to their cathodes, the condenser 338 having been charged will discharge electrons in the same direction through resistor 337 as was the direction of the electrons during the conducting half cycle. A substantially continuous unidirectional voltage drop therefore appears across resistor 337 during both cycles of the alternating voltage.

If the voltage across conductors 334, 335 be of opposite polarity from that indicated, the set 2 will be conductive and set 1 nonconductive in the operative half cycle. The electron flow through resistor 337 will be in the opposite direction from that originally considered, and the voltage across resistor 337 changes with the polarity of the voltage across resistor 211, Figure 3, or in accordance with the side of the beam the craft is on.

The junction of resistor 337 and conductor 334 is connected to ground. It will be now apparent in other words that with the slider 254 of coupler operated potentiometer 253 to one side of the center of its electrical resistor, that the current through the resistor 337 of the rectifier is in one direction whereas when the slider 254 is on the opposite side of the center of its resistor that the current through the resistor 337 is in the opposite direction. A slider 339 bears on resistor 337 which together provide an equivalent precession rate voltage and it is thus apparent that a voltage between the slider 339 and ground varies in polarity in accordance with the side of resistor 255 from the center tap thereof engaged by slider 254.

Connected across the slider 339 and the grounded end of resistor 337 is a resistor 340 having a slider 341. A resistor 343 of a differentiation network 346 extends from the junction of resistor 340 and slider 339 to terminal 291. A rate condenser 344, and a variable resistance 345 connected in series are connected between tap 341 and junction 291.

The voltage output from network 346 is opposed to the bank voltage appearing at terminal 291. Thus, the actual heading correction dictated previously by an integral function the bank angle which is reflected in the extent of rotation of motor 294 is decreased by the output from network 346 so that motor 294 rotates to a less extent and a smaller correction to the heading of the craft is made which as will be clarified permits the craft to assume a heading at an angle to the localizer beam rather than colinear with it.

Having considered the details of one embodiment, the operation thereof follows. The operation may be considered firstly with the function selector knob 182 in the number one position. The craft may be placed on a desired heading by directly manually operating the aileron and rudder control surfaces at which time the aileron amplifier 77 is disconnected from its servomotor 73 and the rudder amplifier 131 is disconnected from its servomotor 126 by opening the single throw switches provided. After this heading is obtained, the amplifiers may be connected to their respective servomotors. Assuming aileron network 84 and rudder network 136 in a balanced condition with the various sliders of the potentiometers at the centers of their respective resistors, a subsequent transient disturbance to the craft tending to move it about its vertical axis will result in the directional gyroscope 10 moving slider 105 from the center of resistor 106. A signal is derived from potentiometer 104 proportional to this displacement which is applied to the aileron network directly and by means of the cross coupling from voltage divider 150 to the rudder network. The aileron and rudder motors are thus operated and position their respective follow up sliders 87 and 139 to rebalance the respective amplifier input circuits. The aileron and rudders are operated to cause the craft to bank and move toward the desired heading.

This bank of the craft causes the vertical gyro 33 to move slider 102 with respect to resistor 103 in such a direction that the signal from potentiometer 101 is of opposite phase from that from directional gyro potentiometer 104 and thus causes the servomotors to move their sliders and therefore their control surfaces back to normal position.

With the heading deviation decreasing, the directional gyroscope 10 moves its slider 105 back toward normal position so that the voltage from the vertical gyro bank potentiometer 101 exceeds that from the directional gyroscope potentiometer 104 thus causing adjustment of the ailerons and rudder in the opposite direction from normal position with resultant movement of the follow up potentiometer sliders 87 and 139 to balance. This opposite positioning of the aileron and rudder tends to lessen the amount of bank of the aircraft and thus its rate of turn. With the lessening of the bank of the craft, the signal from the vertical gyroscope decreases and when the craft reaches the original desired heading the wings are in level flight position.

When manual turns are desired in order to effect change in heading, the pilot operates turn control knob 115 to displace slider 112 in the direction desired to effect a turn. Rotation of the turn control knob 115 also rotates disc 175 to operate arm 177 to close the contacts 179, 180. The caging relay coil 170 thereby has its circuit closed. The circuit extends from battery 354, conductor 352, conductor 351, function selector arm 186, the number one position contact in the upper section of the function selector, conductor 350, contact 180, contact 179, conductor 353, coil 170, to ground and to battery ground.

Coil 170 operates arm 172 into engagement with in contact 173 of relay 169. The caging mechanism is thereby energized through a closed circuit extending from battery 354, conductor 355, relay arm 172, in contact 173, conductor 356, caging coil 166, to ground and to battery ground return. The directional gyro, as operated on by the caging mechanism 165, moves the slider 105 of potentiometer 104 to its center position and retains it there.

The adjustment of slider 112 from the turn control knob 115 unbalances the aileron and rudder networks resulting in operation of the aileron and rudder servomotors until their rebalancing sliders 87 and 139 balance the respective input circuits. The craft thereupon banks and turns due to the applied aileron and rudder. The vertical gyro 33 responds to the bank attitude and adjusts slider 102 in such a direction as to oppose the manually operable turn control signal. The rudder and ailerons are thereby moved toward their normal position. When the craft approaches the desired heading, the turn control knob 115 is moved so slider 112 returns toward its normal position. The signal from the vertical gyro potentiometer 101 at this time exceeds that from the turn control potentiometer 111 so that opposite aileron and rudder movements are given which tend to decrease the bank of the aircraft and decrease its rate of turn. The aileron and rudder control surfaces assume a position dependent upon the differential value of the turn control signal from potentiometer 111 as compared with the bank attitude signal from the potentiometer 101. With the turn control knob centered upon the desired heading being attained, the aircraft will reach an attitude where its wings are in level position. When the turn control knob 115 is moved to center position as stated, the contacts 179, 180 become separated whereby relay coil 170 has its circuit broken and relay arm 172 drops to the position shown whereupon the uncaging coil 167 is energized to move the caging member 164 to uncaged position and permit the directional gyroscope 10 to function.

We may presume that the craft is to land at a field where visibility is poor. When the aircraft has approached the landing field within sufficient distance to receive signals from the radio transmitter located at the field as may be suitably indicated on the conventional cross pointer meter the function selector 182 is placed in the number two position. With the function selector in the number two position, the caging control relay 169 has its coil 170 energized from a circuit extending from battery 354, conductor 352, conductor 351, selector arm 186, the number two position contact of the upper section, conductor 358, conductor 353, coil 170, to ground and to battery ground turn.

Additionally, there is a relay energizing circuit extending from the energized number two position contact of the upper section of the function selector, conductor 359, operating coil 191 of relay 190 to ground and to battery ground return. The relay arms 192, 193, and 194 in sections B, D, and F of relay 190 are moved to their upper position in Figures 2, 3 and 4.

In the lower section of the function selector, engagement of arm 184 with the number two position contact completes a circuit from energized lead 352, arm 184, conductor 360, relay coil 205, to ground and to ground of battery 354. The relay arms 206, 207 are moved to their upper position shown in Figure 2 and Figure 4.

With the relay arms 207, 194 in the up position in Figure 4, the rotation of the coupler motor 240 which is reflected in the displacement of slider 271 and a voltage across potential divider 274 is used to control the craft. This control is effected by applying the voltage from potential divider 274 in one instance by conductors 277, 267, 116, to slider 105 of the directional gyroscope potentiometer 104. This voltage is applied in the other instance from adjustable tap 276, conductor 278, in contact of section E, relay arm 207, in contact of section F, relay arm 194, conductor 117, out contact of section I, relay arm 202, conductor 122, to slider 112 of the turn control potentiometer 111 and through the turn control network 110 to ground whereby the approach coupler signal is effective to control the balance of the input circuits to the aileron and rudder amplifiers to control the heading of the craft and cause it to bracket the localizer beam.

With the aircraft bracketing the localizer beam, the function selector 182 is moved to the number three or glide position contact. Relay 190 remains energized but relay 204 is deenergized. On the other hand the engagement of function selector arm 185 with the number three position contact in the third section completes a circuit from energized lead 352, selector arm 185, conductor 366, operating coil 198, to ground and to battery ground return. The coil 198 operates the arms 199, 200, 201, and 202 to the upper position in Figures 2, 3 and 4. The directional gyroscope 10 remains caged.

It will be appreciated concerning the input circuit to amplifier 293 of the directional substitute that if the sliders 300 and 303 of the rebalancing potentiometer and centering potentiometer were not at the same potentials, with the arm 201 of the H section in the downward position when the function selector is in the number one or number two position, that the amplifier 293 would be operated whereupon the motor 294 would be operated until slider 300 is at the same potential as slider 303 to balance the potentiometer bridge 298.

Signals from the vertical gyro bank potentiometer 101 are applied by conductors 280, 281 through the coupling transformer 283 and phase sensitive rectifier 285 across resistor 290 and thus to the amplifier 293.

If the craft departs laterally from the localizer beam in the number three function selector position, the signal derived thereby and applied to the network 212 effects operation of the coupler motor 240 which displaces sliders 254 and 271. The voltage from the potentiometer 253 due to the displacement of slider 254 is transmitted by the transformer 260 to secondary winding 262. This control voltage is applied from one end of secondary winding through conductor 264 directly to conductor 334 and from the opposite end of secondary winding 262 through conductor 263, out contact of section C relay arm 206, in contact of section D, relay arm 193 to conductor 335. The voltage across conductors 334 and 335 is applied to the rectifier 336 and as rectified to the network 346 and thence the output of the network 346 is combined with the bank voltage appearing across resistor 290.

As was stated the slider 254 of potentiometer 253 is adjusted from the coupler motor 240. The voltage appearing in potentiometer 253 by this adjustment is applied across the voltage dividing potentiometer 257. A portion of this divided voltage is applied in one instance by conductor 266, conductor 267, conductor 116, to slider 105 of the automatic heading control potentiometer 104 and in another instance is applied from the slider 259 of the potential divider 257, out contact of section E, relay arm 207, in contact of section F, relay arm 194, conductor 117, conductor 330, voltage dividing potentiometer resistor 328, adjustable tap 329, conductor 331, in contact of section I, relay arm 202, conductor 122, to slider 112 of the manual turn control potentiometer 111 and thence through the turn control network 110 to ground.

With the aircraft laterally displaced from the localizer beam after once bracketing the same but with a heading parallel to the beam, the signal from the voltage dividing potentiometer 257 causes the craft to bank and turn toward the beam. As the aircraft banks however, the vertical gyro 33 in response to this bank sets up signals to limit the bank and moves the control surfaces back toward center and through its parallel circuit provides a voltage at terminal 291 which effects operation of the amplifier 293 and the motor 294 which adjusts slider 322 to provide a signal which is of opposite phase from the signal provided by the approach coupler from potential divider 257 and increasing in magnitude with bank duration. We may assume that the craft has been merely subjected to a transient disturbance.

As the aircraft approaches the beam, the signal in the approach coupler 210 (Figure 3) from the potentiometer bridge 220 is greater than that provided by the coupler input network 212 so that the coupler motor 240 reverses its direction of rotation and moves the sliders 271 and 254 toward the center position. This decreases the signal from the voltage dividing potentiometer 257 so that it becomes less than the signal from the bank integration controlled voltage divider 327. The aileron and rudder are thereby caused to be moved in the opposite direction to decrease the bank of the aircraft. The amount of opposite aileron applied to the craft at this time depends upon the preponderance of the bank integration signal from potentiometer 327 with respect to the coupler signal obtained from potential divider 257. This excess may be of such extent that the craft may be actually banked into an opposite attitude from that originally assumed when moving toward the beam following its transient disturbance.

With the craft oppositely banked the voltage appearing at terminal 291 is of opposite phase and causes the unbalance of the input to amplifier 293 to be in the opposite direction from the initial unbalance. The motor 294 rotates in such a direction as to decrease the voltage output of potentiometer bridge 298 permitting condenser 312 to discharge and balance the bank voltage.

The amplifier 293 causes the motor 294 to reverse its rotation and move the slider 322 toward its normal position thereby decreasing in effect the integrated bank signal from voltage dividing potentiometer 327 (Figure 4).

The action is continuous in that as the craft approaches the beam with the airplane now oppositely banked, the signal from the approach coupler provided by voltage divider 257 and the integrated bank signal from potentiometer 327 decrease and are reduced to zero when the craft is aligned with the localizer beam.

A condition may now be assumed where the craft is subject to a cross wind after bracketing the localizer beam. The cross wind will displace the craft from the beam laterally without necessarily changing the heading of the craft. The ILS receiver 16 applies a voltage across the resistor 211 proportional to the displacement of the craft from the beam. This voltage as modified by network 212 causes the amplifier 245 to operate. Amplifier 245 through motor 240 and as limited by its rebalancing slider 227 positions the slider 254 in accordance with the magnitude of the localizer signal. The signal from potentiometer 253 is applied across the voltage divider 257 and as before is applied to the turn control portion of the autopilot which controls the aileron and rudder. The signal from potentiometer 253 is also applied to the rectifier 336 and thence to network 346. The signal from voltage divider 257 causes the craft to bank and turn toward the beam from which it was displaced.

The vertical gyroscope responds to the bank attitude and provides a signal which is applied to amplifier 293 as before and the integration effected by motor and bridge network 298 along with condenser 312 and resistor 309 is continuous. As the aircraft is also approaching the beam in its banked attitude, the integrated signal which is reflected in the adjustment of slider 322 eventually exceeds the coupler input signal, and the ailerons are moved in an opposite direction from their streamlined position thus tending to cause the craft to go into an opposite bank so that the craft in effect makes an S turn in the correcting maneuver.

However, by feeding into the input circuit of amplifier 293 a signal from network 346 in opposition to the bank signal, the point at which the craft goes into the opposite bank attitude is delayed since the integrated signal in effect is decreased. Since the integration signal at the time it exceeds the coupler signal is much less than when no cross wind compensation was applied, it will require less change in heading of the craft and therefore less bank integration to reduce this initial modified bank integration signal to zero. In other words the aircraft changes its heading initially when correcting for its displacement from the beam a greater angular amount than it changes heading when the modified bank integrated signal exceeds the coupler signal so that when this integrated signal is removed the craft is still headed at an oblique angle across the localizer beam. The angular displacement which the craft assumes across the beam is sufficient to give it a heading up wind which compensates for the drift of the craft across the beam.

The added purpose of the condenser 312 associated with the potentiometer bridge 298 in the substitute directional stabilizing unit 232 will now be mentioned. The voltage suppled from the rebalancing bridge 298 is supplied to resistors 309, 310 through the series connected condenser 312. With this condenser in series with the resistors, it is apparent that a voltage drop will appear across the resistor 309, 310 only when the voltage output from the potentiometer bridge 298 is changing. If the bridge reaches a point where the voltage is not changing but has a steady value output the condenser 312 will have become fully charged and no current will pass through the resistors 309, 310 and there will thus be no voltage drop across them. This voltage drop across resistors 309 and 310 is used to balance the input voltage which input voltage is a combination of the bank voltage at terminal 291 and the output of the network 346.

This combination input voltage signal will reach a steady state value only when the craft has reached a flying position wherein its wings are level although the aircraft may be still displaced from the localizer beam. The fact that the aircraft has not reached the localizer beam indicates that the craft has not been headed up wind sufficiently to compensate for a cross wind. Thus the steady state signal from the coupler as applied through network 346 to amplifier 293 is unopposed by any rebalancing signal from the potentiometer bridge 298. The motor 294 is thereupon rotated to position slider 322 of potentiometer 323 in the stabilizing unit to effect operation of the ailerons and rudder to cause the craft to head up wind at a sufficient angle to maintain the craft on the beam despite the cross wind effect so that the radio signal is reduced to zero.

It is now apparent that there has been provided a novel control apparatus for automatically controlling the heading of an aircraft which includes a directional stabilizing unit controlled by the bank attitude of the aircraft. Said control system furthermore includes radio control means for causing the aircraft to follow a localizer beam which control means is modified by a control device responsive to the bank attitude of aircraft. Furthermore this control device has its effect modified from the radio control means to compensate for a cross wind on the aircraft so that the craft is maintained on the beam and that a novel reset arrangement is provided for positively insuring that the craft follows the localizer beam. As many changes could be made in the above described construction of an embodiment of the invention without departing from the scope thereof it is intended that the above description be considered illustrative and that the scope of the invention be defined by the following claims.

I claim as my invention:

1. Heading control apparatus for an aircraft having an aileron control surface for altering the heading of said craft, said apparatus comprising: motor means adapted to operate said control surface; a balanceable control means adapted to effect operation of said motor means on unbalance thereof; a vertical gyroscope responsive to tilt of said craft about the roll axis; a roll signal generator driven by said gyroscope for providing a signal proportional to magnitude of craft roll; signal integrating means connected to said roll signal generator for providing an output signal proportional to an integration with respect to time of the roll signal; and means for connecting said roll signal generator and the output of said integrating means to said balanceable control means, whereby when a disturbance causes said craft to tilt about its roll axis and thus change heading in proportion to the integration of the magnitude of tilt said craft is restored by said integrating means to its original heading.

2. Steering apparatus for a dirigible craft having a control surface for changing its heading, said apparatus comprising: motor means adapted to adjust said control surface; signal operated means for controlling said motor means; means responsive to tilt of said craft about its roll axis; a balanceable network connected to said signal operated means and supplying a signal on unbalance thereof; said network including a plurality of signal generators; means for adjusting one generator from said tilt responsive means in proportion to the said tilt of the craft; means controlled by the tilt responsive means for adjusting a second generator in proportion to the magnitude and duration of said tilt so that said generator is adjusted in accordance with the change in heading of the craft; and means for adjusting a third generator in proportion to the extent of adjustment of said motor means, whereby changes in heading due to tilt of said craft are corrected.

3. Control apparatus for a dirigible craft, said apparatus comprising: a vertical gyroscope responsive to tilt of said craft about its longitudinal axis; means positioned by said gyroscope to provide a first signal proportional to the magnitude of tilt; signal integrating means comprising a motor controlled by said signal and operating at a rate proportional to said signal whereby to provide a second signal proportional to the magnitude and duration of said first signal which second signal is proportional to the craft change of heading; and means for steering the craft in accordance with the value of said second signal to maintain the heading of said craft on a selected course.

4. In control apparatus for an aircraft; craft heading change detecting means comprising: direction maintaining means responsive to tilt of said craft about its longitudinal axis; a first signal generator adjusted by said maintaining means for producing a signal proportional to the direction and magnitude of craft tilt; signal integrating means connected to said generator for providing a second signal porportional to the magnitude and duration of craft tilt and thus proportional to the change in heading of said craft; and further means algebraically combining said first and second signals.

5. Control apparatus for an aircraft, having a control surfac for changing its heading, said apparatus comprising: gravitational responsive means for generating a voltage proportional to the magnitude of tilt of said craft about its longitudinal axis; integrating means controlled by said voltage for producing a further voltage in proportion to the magnitude and duration of said generated voltage; a motor; a follow-up voltage generator driven by said motor; control means responsive to unbalance of said further voltage and said follow-up voltage; a control surface power means, a signal operated control means for said power means; a signal generator adjusted in proportion to the extent of movement of said motor; a signal generator adjusted in proportion to the extent of movement of said power means; means for applying both said signals to said signal operated control means to effect operation of said power means on unbalance of said signals; and means for positioning said control surface from said power means, to stabilize the heading of said craft.

6. Control apparatus for an aircraft, having a control surface for changing its heading, said apparatus comprising: gravitational responsive means for generating a voltage proportional to the magnitude of tilt of said craft about its longitudinal axis; integrating means controlled by said voltage for producing a further voltage in proportion to the magnitude and duration of said generated voltage; radio means for producing a voltage proportional to the displacement of the craft from a given ground path; a motor; a follow-up voltage generator driven by said motor; control means responsive to unbalance of said further voltage, said displacement voltage, and said follow-up voltage; a control surface power means, a signal operated control means for said power means; a signal generator adjusted in proportion to the extent of movement of said motor; a signal generator adjusted in proportion to the extent of movement of said power means; means for applying both said signals to said signal operated control means to effect operation of said power means on unbalance of said signals; and means for positioning said control surface from said power means, to stabilize the heading of said craft along said ground path.

7. Control apparatus for an aircraft having a displaceable control surface for altering the heading steered by said craft, said apparatus comprising: power means for adjusting said surface; means for deriving a composite voltage signal having components proportional to the tilt of said craft about its longitudinal axis, to a time integration of said tilt and of the displacement of said craft from a selected ground path, and to the displacement of said control surface; a signal responsive device for operating said power means in a direction dependent on the polarity of a signal applied thereto; and means for applying said composite signal to said signal responsive device, to head said craft along said path.

8. Control apparatus for an aircraft having a control surface to alter the course steered by said craft, said apparatus comprising: power means for operating said surface; craft tilt responsive means for generating an alternating voltage proportional to the magnitude of bank of said craft; rectifying means responsive to said alternating voltage to provide a direct voltage proportional to bank of said craft; means for converting the direct bank voltage to an integrated bank alternating voltage; means for deriving a resultant alternating signal voltage having components proportional to the craft bank alternating voltage, the integrated bank alternating voltage, and the extent of operation of said surface; and control means responsive to said resultant signal voltage for controlling the direction of operation of said surface by said power means in accordance with the phase of said resultant signal voltage.

9. Control apparatus for an aircraft having a control surface to alter the course steered by said craft, said apparatus comprising: power means for operating said surface; craft tilt responsive means for generating an alternating voltage proportional to the magnitude of tilt; electronic rectifying means having two sets of elements each having a plate, a grid and a cathode, means for connecting the plate of each set to the cathode of the other set, means for applying an alternating line voltage of the same phase between the grid and cathode of each set, means for applying the magnitude of craft tilt alternating voltage in series with a rectifier output resistor across the plate and cathode of one set of elements and thus across the cathode and plate of the other set to provide across said resistor a direct voltage proportional to tilt; means for converting the direct voltage to an integrated bank alternating voltage; means for deriving a resultant alternating voltage signal having components proportional to the craft tilt alternating voltage, the integrated bank alternating voltage, and the extent of operation of said surface; and control means responsive to said resultant voltage signal for controlling the direction of operation of said surface by said power means in accordance with the phase of said resultant voltage signal.

10. Control apparatus for an aircraft having freedom of movement about its bank and vertical axes; said apparatus comprising: attitude means responsive to tilt of said craft about its longitudinal axis for generating a signal proportional to the magnitude of said tilt; means operated by said signal for deriving a second signal proportional to a time integration of said tilt signal and thus to craft change in heading; power means adapted to change the position of said craft about the vertical axis; and means for controlling said power means from said second signal.

11. Control apparatus for an aircraft having an aileron control surface for banking said craft, said apparatus comprising: power means for operating said surface; displaceable means for deriving a resultant alternating voltage signal having components proportional to the tilt of said craft about its longitudinal axis, proportional to a time integration of the tilt of said craft and thus to the change in heading of said banked craft, and proportional to the extent of operation of said power means, and signal operated means for controlling the direction of operation of said power means in accordance with the phase of said resultant signal.

12. In control apparatus for an aircraft, means for providing a unidirectional voltage which is a time integral of the attitude of the craft about its longitudinal axis comprising: gyro means for generating an alternating voltage proportional to the attitude of said craft about its roll axis; a phase sensitive vacuum tube rectifier having two output terminals and connected to said gyro means and converting said alternating voltage to a direct voltage; a resistor having one end connected to one output terminal of said rectifier, a condenser connected across the free end of the resistor and the other output terminal and a further resistor connected across the junction of said resistor and condenser and said other output terminal whereby a unidirectional voltage as stated is provided across said further resistor.

13. In apparatus for automatically steering an aircraft, a craft roll responsive device; integration means operated by said device for obtaining a time integration of craft roll attitude and thus of banked craft heading change for maintaining a course; manually operated means for setting a new course relative to the course maintained; power means for operating a heading control member on said craft; means for alternatively operating said power means from said integration means or said manual means and means for rendering the integrating means ineffective during operation of said manually operated means.

14. Control apparatus for an aircraft having a control surface for altering its headings, said apparatus comprising: power means for adjusting said control surface; craft roll attitude responsive means displaceable in accordance with the magnitude of roll; motor means operated in proportion to the time integration of the displacement of said roll responsive means and thus to banked craft heading change; and control means for said power means operable on differential movement of said movement of said motor means and said power means for maintaining the heading of said craft.

15. In steering apparatus for a dirigible craft having a control surface for altering its heading, motor means adapted to operate said control surface; signal operated means for controlling said motor means; radio means for deriving a signal in accordance with the displacement and rate of change of displacement of said craft from a predetermined ground course and connected to said signal operated means to bank said craft and thus cause it to change heading toward said course; craft roll responsive means for deriving a signal proportional to the roll of said craft and connected to said signal operated means in opposition to said radio derived signal to limit the bank of said craft; signal integrating means connected to the radio means and roll responsive means for integrating said radio means derived and craft roll signals; and means for applying said integrated radio derived and roll signals to said signal operated means to effect opposite bank of said craft whereby said radio means initiates change of heading of said craft toward said predetermined course and said integrating means modifies thereafter said craft heading to stabilize said craft on said course.

16. In steering apparatus for a dirigible craft having a control surface for altering its heading, motor means adapted to operate said control surface; signal voltage operated means for controlling said motor means; radio means for deriving a signal voltage in accordance with the magnitude of the displacement of said craft from a predetermined ground course; craft roll responsive means for deriving a signal voltage proportional to the magnitude of roll of said craft; signal integrating means connected to the radio means and roll responsive means for integrating with respect to time said radio means and craft roll signals; and means for applying said radio displacement signal, said roll signal, and said integrated radio means and roll signal to said signal operated means whereby on lateral displacement from the ground course said radio means initiates a change in heading of said craft toward said course in a banked turn limited by the roll responsive means and said integrating means reverses the change in heading to bring said craft on said predetermined course with said integrating means thereafter maintaining said craft on said ground course.

17. Control apparatus for an aircraft having a control surface differentially displaceable from a normal position for altering the course steered by said craft, said apparatus comprising: power means for adjusting said surface; signal providing means for generating a voltage signal; a vertical gyroscope operating said signal providing means proportional to the tilt of said craft about its longitudinal axis; motor means responsive to said gyroscope and operating said signal providing means proportional to a time integration of said tilt; and a follow-up means driven according to the differential displacement of said control surface and connected to the signal providing means for operating said signal providing means; a signal operated device for operating said control surface power means; and means for applying said signal, which corresponds to the operating summation of said providing means, to said device for maintaining the course of said craft.

18. In control apparatus for an aircraft for causing said craft to follow a predetermined ground path, radio operated means for deriving a first signal proportional to the displacement of said craft from said ground path defined by waves emitted by a radio transmitter; means providing a second signal proportional to the craft bank attitude; means providing a third signal in accordance with a composite time integration of the second signal and the first signal; means for combining said third signal and said first signal; a power means for operating a control surface to change the heading of said craft; and means controlled by said combined signals to operate said power means in proportion to said modified signal.

19. Flight path control apparatus comprising, in combination: means for giving a first signal in accordance with the amount and sense of the lateral displacement of a craft from a desired path; means for giving a second signal in accordance with the amount and sense of the angular displacement of the craft from a desired roll attitude; means giving a third signal in accordance with the time integral of the sum of said signals; and means connected to all the above named means for changing the heading of the craft in accordance with said signals.

20. Flight path control apparatus comprising, in combination: means for giving a first alternating voltage whose phase and amplitude are determined by the direction and amount of the lateral displacement of a craft from a desired path; means for giving a second alternating voltage whose phase and amplitude are determined by the direction and magnitude of the angular displacement of the craft from a desired roll attitude; means giving a third alternating voltage determined in phase and amplitude by the time integral of the amplitude of the algebraic sum of said first and second alternating voltages; and means connected to all the above named means for changing the heading of the craft in accordance with said first and third alternating voltages.

21. Flight path control apparatus comprising, in combination: means for giving a first signal in accordance with lateral deviation of an aircraft from a desired path; means for giving a second signal in accordance with angular deviation of the aircraft from a desired roll attitude; adjustable means for supplying a continuously variable third signal; motor means adjusting said adjustable means; motor control means causing operation of said motor means at a speed and in a direction determined by the magnitude and sense of an input thereto; means combining said first and second signals and applying them to said motor control means as an input therefor; and means connected to said adjustable means for changing the heading of the craft in accordance with said first, second and third signals.

22. Flight path control apparatus comprising, in combination: means for giving a first signal in accordance with the amount and sense of the lateral displacement of a craft from a desired path; means for giving a second signal in accordance with the amount and sense of the angular displacement of the craft from a preselected roll attitude; means giving a third signal in accordance with the time integral of the sum of said signals; and means connected to all the above named means for changing the heading of the craft in accordance with the joint effect of said first and third signals.

23. Flight path control apparatus comprising, in combination: means for giving a first signal in accordance with the amount and sense of the lateral displacement of a craft from a desired path; means for giving a second signal in accordance with the amount and sense of the angular displacement of the craft from a preselected roll attitude; means giving a third signal in accordance with the time integral of the sum of said signals; and means connected to all the above named means for changing the heading of the craft in accordance with the joint effect of said second and third signals.

24. Flight path control apparatus comprising, in combination: means for giving a first signal in accordance with lateral deviation of an aircraft from a desired path; adjustable means for supplying a continuously variable second signal; motor means adjusting said adjustable means; motor control means causing operation of said motor means in a direction determined by the magnitude and sense of an input thereto for as long as said input persists; means supplying said first signal to said motor control means as an input therefor; and means connected to said adjustable means for changing the heading of the craft in accordance with said first and second signals.

25. Flight path control apparatus comprising, in combination: means for giving a first signal in accordance with lateral deviation of an aircraft from a desired path; means for giving a second signal in accordance with angular deviation of the aircraft from a desired roll attitude; adjustable means for supplying a continuously variable third signal; motor means adjusting said adjustable means; motor control means causing operation of said motor means at a speed and in a direction determined by the magnitude and sense of an input thereto; means supplying said second signal to said motor control means as an input therefor; and means connected to said adjustable means for changing the heading of the craft in accordance with said first and third signals.

26. Flight path control apparatus comprising, in combination: means for giving a first signal in accordance with lateral deviation of an aircraft from a desired path; means for giving a second signal in accordance with angular deviation of the aircraft from a desired roll attitude; adjustable means for supplying a continuously variable third signal; motor means adjusting said adjustable means; motor control means causing operation of said motor means at a speed and in a direction determined by the magnitude and sense of an input thereto; means supplying said first and second signals to said motor control means as inputs therefor; and means connected to said adjustable means for changing the heading of the craft in accordance with said first and third signals.

References Cited in the file of this patent

UNITED STATES PATENTS

| Number | Name | Date |
|---|---|---|
| 2,408,770 | Frische et al. | Oct. 8, 1946 |
| 2,464,629 | Young | Mar. 15, 1949 |
| 2,496,809 | Moseley | Feb. 7, 1950 |
| 2,516,641 | Murphy | July 25, 1950 |
| 2,525,038 | Kutzler | Oct. 10, 1950 |
| 2,548,278 | Wirkler | Apr. 10, 1951 |
| 2,553,597 | Maroni | May 22, 1951 |
| 2,571,260 | Kutzler | Oct. 16, 1951 |